United States Patent
Bossi et al.

(10) Patent No.: US 7,561,532 B2
(45) Date of Patent: Jul. 14, 2009

(54) METHOD AND DEVICE FOR DESIGNING A DATA NETWORK

(75) Inventors: Mariachiara Bossi, Turin (IT); Andrea Allasia, Turin (IT); Luigi Giuseppe Varetto, Turin (IT); Roberto Rita, Rome (IT)

(73) Assignee: Telecom Italia S.p.A., Milan (IT)

( * ) Notice: Subject to any disclaimer, the term of this patent is extended or adjusted under 35 U.S.C. 154(b) by 551 days.

(21) Appl. No.: 10/538,833

(22) PCT Filed: Dec. 16, 2002

(86) PCT No.: PCT/EP02/14312

§ 371 (c)(1), (2), (4) Date: Jun. 13, 2005

(87) PCT Pub. No.: WO2004/056041

PCT Pub. Date: Jul. 1, 2004

(65) Prior Publication Data

US 2006/0067234 A1    Mar. 30, 2006

(51) Int. Cl.
    H04L 12/28    (2006.01)
    G01R 31/08    (2006.01)
(52) U.S. Cl. .................. 370/255; 370/236; 370/238; 370/248
(58) Field of Classification Search ......... 370/254–258, 370/248, 236
    See application file for complete search history.

(56) References Cited

U.S. PATENT DOCUMENTS

| | | | |
|---|---|---|---|
| 5,809,282 A | 9/1998 | Cooper et al. | |
| 6,223,220 B1 | 4/2001 | Blackwell et al. | |
| 6,285,688 B1 | 9/2001 | Henderson et al. | |
| 2002/0036988 A1* | 3/2002 | Cardwell et al. | 370/238 |
| 2002/0097716 A1* | 7/2002 | Kumaran et al. | 370/389 |
| 2002/0186665 A1* | 12/2002 | Chaffee et al. | 370/255 |
| 2004/0095887 A1* | 5/2004 | Klincewicz et al. | 370/237 |

OTHER PUBLICATIONS

López et al., "Optimizing Network Throughput: Optimal Versus Robust Design"; Proceedings of the Seventh Euromicro workshop on Funchal, Portugal, Feb. 3-5, 1999, Parallel and Distributed Processing, IEEE Comput. Soc., pp. 45-52, (1999).

* cited by examiner

Primary Examiner—Kwang B Yao
Assistant Examiner—Jutai Kao
(74) Attorney, Agent, or Firm—Finnegan, Henderson, Farabow, Garrett & Dunner, L.L.P.

(57) ABSTRACT

A method of designing a transport network having a plurality of network elements and a plurality of connections between the network elements by (a) defining a first network configuration and at least one alternative network configuration for the same transport network; (b) calculating for each network configuration, a probability function representing, for each maximum number of routable flows, the probability of routing such a number of flows in the network configuration currently considered; (c) calculating for each network configuration, a unit-cost-per-flow function calculated as the ratio between a sum of the costs relative to the network elements of the network configuration currently considered and the probability function; and (d) comparing the unit-cost-per-flow functions of the network configurations considered, for choosing a network configuration having a lowest unit-cost-per-flow value.

12 Claims, 5 Drawing Sheets

METHOD AND DEVICE FOR DESIGNING A DATA NETWORK

CROSS REFERENCE TO RELATED APPLICATION

This application is a national phase application based on PCT/EP2002/014312, filed Dec. 16, 2002, the content of which is incorporated herein by reference.

FIELD OF THE INVENTION

The present invention refers to a method and a device for designing a transport network.

BACKGROUND ART

According to conventional communication network design methods, an optimum design of a network is conducted only when a new network is planned for the first time. During the design process, path and link capacities of a network are designed for a given specific traffic demand. For a given predetermined demand pattern an optimisation of the network design is conducted, and an optimum network minimizing the cost is designed. Afterwards, as the demand pattern changes from the pattern considered during the initial planning phase, it is likely that the efficiency of the network decreases day after day.

In actual telecommunication networks, indeed, the demand pattern varies very frequently, depending upon changes in client subscriptions or changes in traffic load due to the widespreading of new communication services or the introduction of new techniques.

It follows that, in a conventional network, forecast of the demand is hardly possible. Moreover, in multimedia networks of recent years, demand forecast has become more and more difficult.

Currently, the re-design of computer networks, particularly wide area networks, is a complex procedure requiring specialist trained staff. For a nation-wide network, it may take a specialist several weeks to design and simulate an alternative network architecture.

Very often, as the traffic demand increases in correspondence of a particular path or node of a network, a network administrator/operator intervenes simply adding new apparatuses, in order to solve the problem very rapidly. As a consequence the network configuration, as well as the architecture of single nodes, grows in an irregular, confused and very expensive way.

In U.S. Pat. No. 6,223,220 a method of designing a computer network is disclosed making use of an object-based computer representation which allows on-screen linking of a service object, representative of a network service, to site objects representative of physical sites on a wide-area network. The user specifies expected traffic demands between the sites, and an algorithm calculates a physical connectivity map representative of proposed hardware circuits linking physical sites.

The method disclosed in U.S. Pat. No. 6,223,220 analyses the network under known traffic conditions, for determining a network configuration which is optimised for those particular conditions. The network optimisation obtained is therefore strictly connected to a particular traffic condition, representative of a past traffic flow, and does not derive from a forecast of possible future traffic flows on the network.

The Applicant has tackled the problem of designing or optimising a transport network, or even a single network node, in order to satisfy an estimated future traffic demand on the network, with particular attention to realization and reorganization costs. To this purpose a network design and analysis method allowing to evaluate the flow's cost for different network structures is described.

In the following the term "flow" is intended as the allocation, on a transport network system, of an amount of structured bandwidth.

The Applicant observes that one of the main goals when a telecommunication network has to be planned or optimised, is to understand which is the best topology to adopt in order to satisfy the traffic demand and, preferably, to save money.

The Applicant is of the opinion that, since one would hardly know how the traffic demand will evolve in a network, it would be useful to a network administrator/designer to have a methodology able to show, for different network topologies, the probability to satisfy client's needs.

In view of the above, it is an object of the invention to provide a network design and analysis method and device allowing to evaluate the flow's cost for different network topologies, allowing to understand which is the best configuration or evolution for the network under study.

SUMMARY OF THE INVENTION

According to the invention that object is achieved by means of a method and a device for designing a transport network, the network having a plurality of network elements and a plurality of connections connecting the elements, comprising means for defining a plurality of alternative network topologies to be analysed, means for evaluating, for each alternative topology, a probability of satisfying a maximum number n of flows, and means for evaluating a flow's relative cost for the alternative topologies, allowing to understand which is the best configuration or evolution for the network under study.

BRIEF DESCRIPTION OF THE DRAWINGS

The invention will now be described, by way of example only, with reference to the annexed figures of drawing, wherein.

DETAILED DESCRIPTION OF A PREFERRED EMBODIMENT OF THE INVENTION

With reference to the flow diagram of FIG. 1, a network design and analysis method allowing to evaluate the flow's cost for different network structures will be described herein below.

As a first step (block 4 in diagram of FIG. 1) it is necessary to define a plurality of alternative network configurations, each configuration being defined by a plurality of network elements interconnected by a plurality of connections.

For each network under study, the following input data have to be specified:

number of nodes/equipments inside the network;

number and typologies of the links (real or hypothetical) between nodes/equipments.

A first network configuration can be, for example, the configuration of an existing network which will be compared with a number of alternative network configurations, in case the design method is used for optimising an existing network or node; otherwise the method according to the invention can be used as a design tool for designing a new network architecture or even a single node of a network.

Once a plurality, at least two, of network configurations X have been defined the methodology follows the following main steps:

evaluation (block 6 in FIG. 1) for the configurations under study, of the probability of satisfying a maximum number n of flows; this step calculates, for each alternative network configuration $X_i$, a probability function P(n) representing, for each maximum number n of routable flows, the probability of routing such a number of flows in the network configuration currently considered;

evaluation (block 8 in FIG. 1) of a complexity value, representative of a flow's unitary cost, for different network configurations; this step calculates, for each alternative network configuration, a complexity function $C_i(n)$, corresponding, in terms of costs, to a unit-cost-per-flow function, calculated as the ratio between a sum of complexity factors, or costs, relative to the network elements of the network configuration currently considered and the probability function P(n) previously obtained;

determination (block 10 in FIG. 1) of the best configuration; this step is performed by comparing each other the complexity, or unit-cost-per-flow, functions $C_i(n)$ of the alternative network configurations, for choosing a network configuration having a lowest unit-cost-per-flow, or complexity, value.

The step of evaluation of the probability P(n) of routing at maximum n flows (block 6 in FIG. 1) will now be described in detail, with reference to FIG. 2.

Once the number of nodes/equipments and the number of links existing between them has been defined, in order to compare different network structures, such structures are analysed under random traffic condition or under polarized traffic condition, depending from the features of the network under study.

Figure 2:
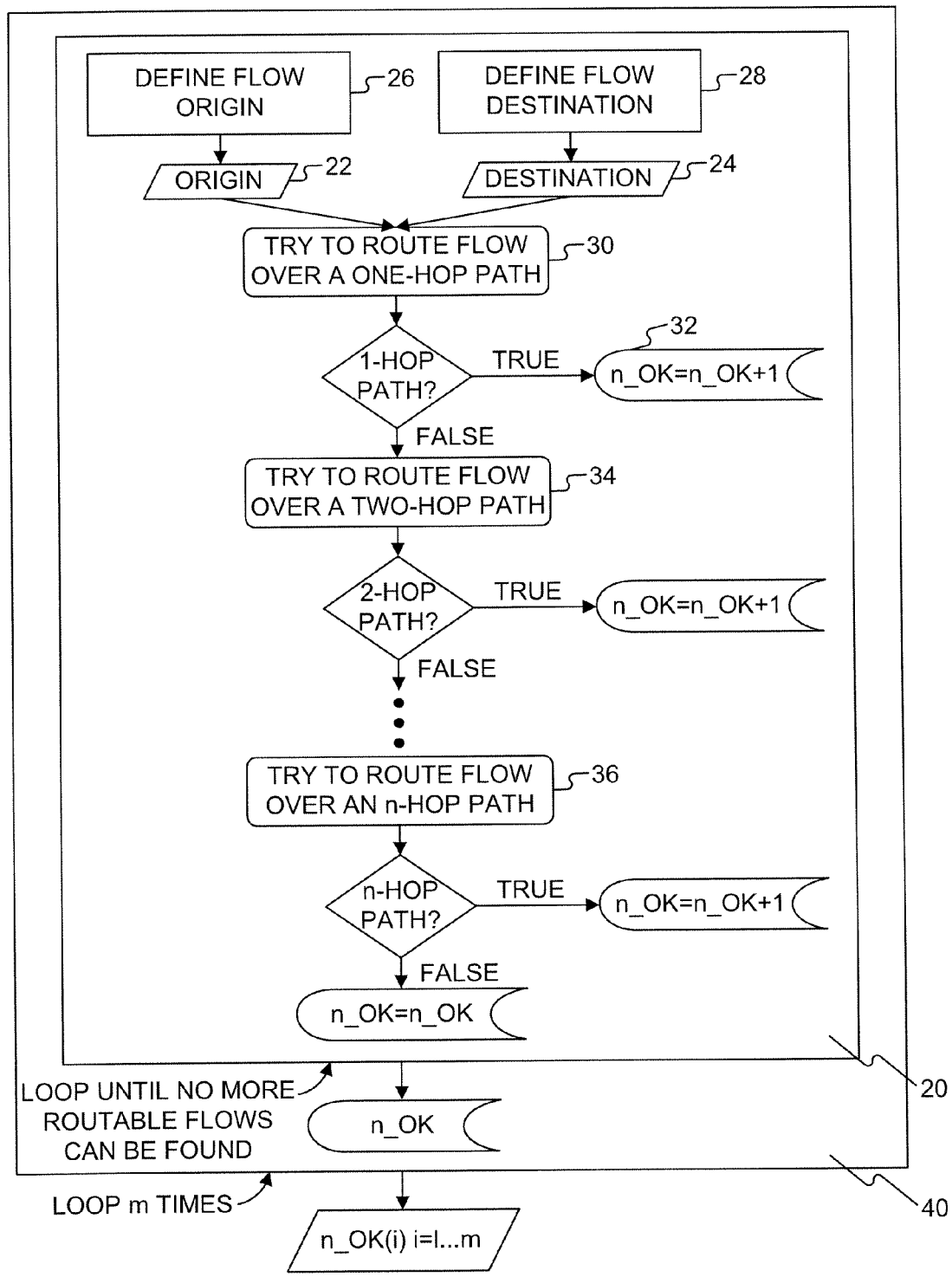
FIG. 2 is a detailed flow diagram of a probability evaluation routine used in the method shown in FIG. 1.

Considering a random traffic demand, a random number in the range between 1 and the number of nodes/equipments of the network is generated (block 26 in FIG. 2); this number represents the flow's origin (block 22 in FIG. 2). A second random number, belonging to the same range but different to the first one, is then generated (block 28 in FIG. 2); this second number will be the flow's destination (block 24 in FIG. 2).

Otherwise, if a polarized traffic demand has to be considered, different weights have to be assigned to one or more directions (a direction is the path between origin and destination), in the traffic generator (blocks 26 and 28 of FIG. 2).

Once the flow's origin and the destination (blocks 22 and 24 of FIG. 2) have been defined, the process tries to route it on the cheapest path, that's to say on the path using only one hop (block 30 FIG. 2). If this path is free, the flow is routed, a partial counter n_OK of maximum routable flows is increased (block 32 FIG. 2), and a new flow is generated (routine 20 is re-executed until no more routable flows can be found). Otherwise, the process tries to route the same flow on a more expensive path (i.e. a two hops path, block 34 of FIG. 2, and so on, up to n-hops path, block 36 of FIG. 2. When it is not possible anymore to route a path inside the network's structure under study, routine 20 terminates, and a maximum number of flows routable n_OK is obtained.

The procedure of routine 20 is then repeated m times (loop 40 of FIG. 2), where m is big enough in order to obtain a valid statistical data, for example m=50000. Each run of the routine generates a new value n_OK(i), with i=1 . . . m.

The values n_OK(i) are used for calculating the probability function P(n), as the empirical probability of an event can be defined as the ratio between the number of favourable outcomes and the total number of outcomes:

$$P(n) = \frac{F(n)}{m}$$

where F(n) is the frequency of each maximum number n of routable flows, and m is the number of times the procedure has been repeated. The maximum number n of routable flows corresponds to the value n_OK previously determined.

The step previously described is repeated for every network configuration $X_i$ under evaluation, calculating, for each configuration, a probability function $P_i(n)$. In this way, the maximum number of flows routable inside the network is evaluated for all network configurations.

Analysing the probability functions $P_i(n)$ it is possible, as described in detail in the following, to compare the different network configurations. Once the probability of routing at maximum n flows has been evaluated for any different structures of the network under study, in fact, it becomes possible to compare their costs and advantages.

In order to do that, the method considers the number of transmitting elements, or network elements, used in the different network's structures analysed and their relative complexity, or costs, for calculating a complexity function $C_i(n)$ representing a unitary cost per flow for each network configuration. The function $C_i(n)$, which is a function of the maximum number of routable flows, corresponds to a unit-cost-per-flow function and is defined as follows:

$$C_i(n) = \frac{\sum_{j=1}^{n\text{-transmitting }el.} \text{transmitting}\,el.(j) \cdot \text{relativecost}(j)}{P_i(n)}$$

Function $C_i(n)$ represents, for each alternative network configuration $X_i$, the ratio between a sum of the costs (relativecost(j)) relative to the network elements of the network configuration currently considered, which are proportional to the complexity of the same network elements, and the corresponding probability function $P_i(n)$.

By the comparison, for the different network configurations $X_i$ under study, of the values of the function $C_i(n)$, it becomes possible to understand which is the best network configuration in terms of complexity, and therefore in terms of costs (the configuration having a lowest complexity, or unit-cost-per-flow, value).

In particular, in order to design or optimise the network in view of future needs, in terms of maximum number of routable flows on the network, the step of comparing the unit-cost-per-flow functions $C_i(n)$ is performed calculating the function $C_i(n)$ in correspondence of a particular estimated maximum number n of routable flows. The estimated maximum number n of routable flows can be based, for example, on a forecast.

Figure 1:
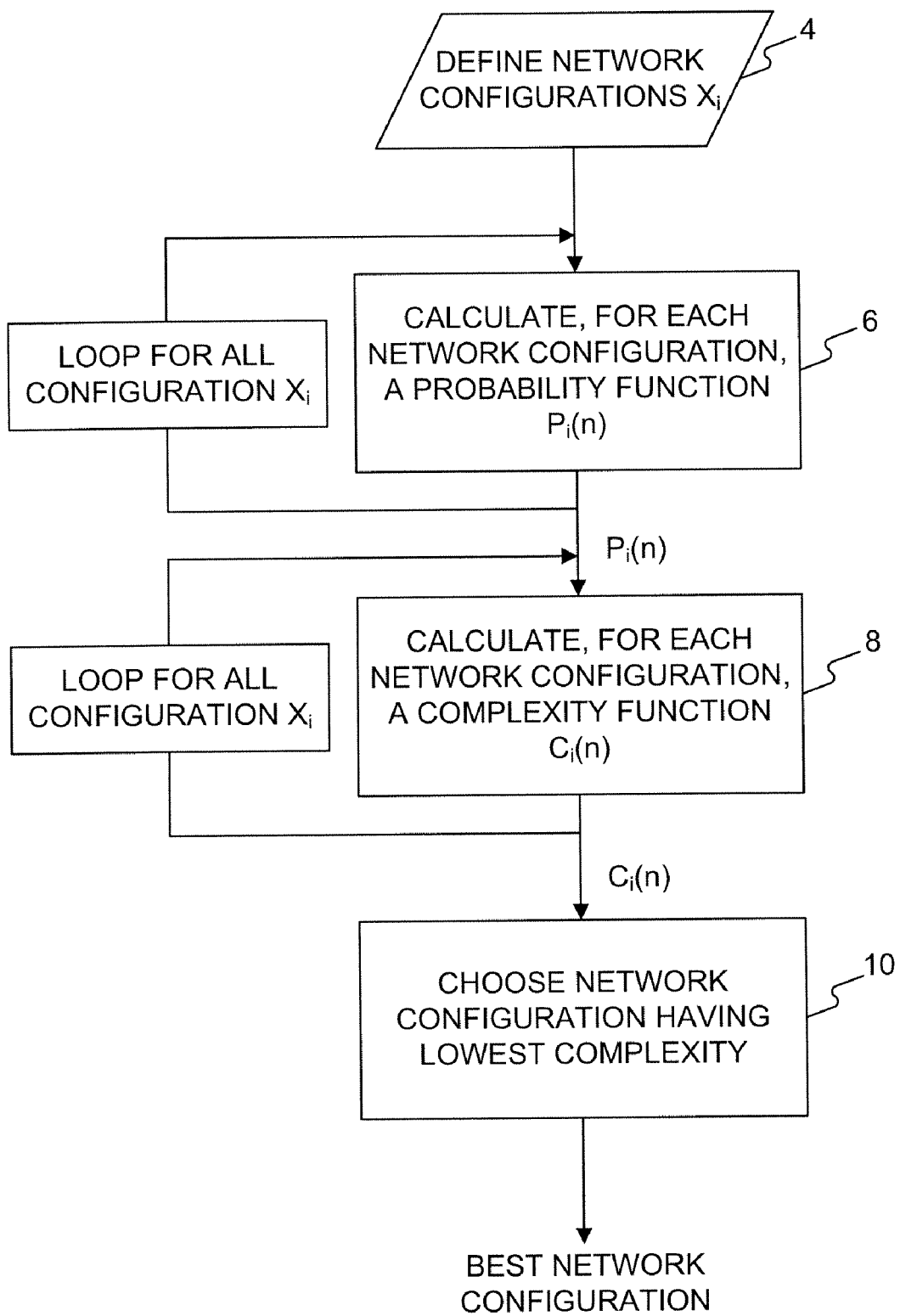
FIG. 1 is a flow diagram of a method of designing a transport network realized according to the present invention.

The method described above can be implemented in a device, whose structure is as well represented by the diagram of FIG. 1, for designing a transport network comprising the following main units:

a network configuration unit 4, for defining a first network configuration and at least one alternative network configuration;

a probability evaluation unit 6, for calculating, for each network configuration $X_i$, a probability function $P_i(n)$ representing, for each maximum number n of routable flows, the probability of routing such a number of flows in the network configuration currently considered;

a complexity, or unit-cost-per-flow, evaluation unit 8, for calculating, for each network configuration, a complexity function $C_i(n)$ calculated as the ratio between a sum of the costs relative to the network elements of the network configuration currently considered $X_i$ and the probability function $P_i(n)$;

a comparison unit 10, for comparing the complexity functions $C_i(n)$ of the network configurations, for choosing a network configuration having a lowest complexity, or unit-cost-per-flow, value.

The method and device according to the present invention can be implemented as a computer program comprising computer program code means adapted to run on a computer. Such computer program can be embodied on a computer readable medium.

Figure 3:
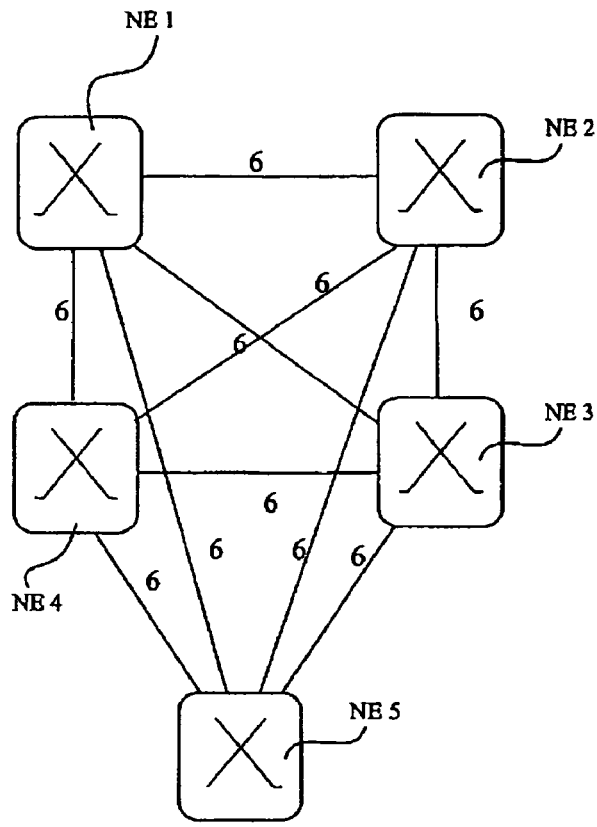
FIG. 3 is a block diagram of a first network topology considered for illustrating a method according to the present invention.
Figure 4:
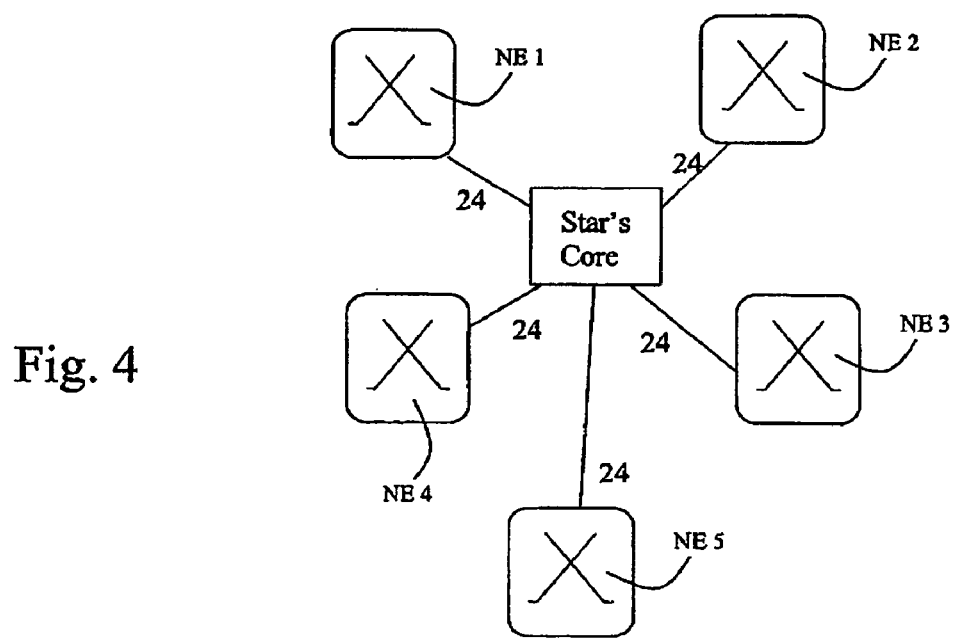
FIG. 4 is a block diagram of a second network topology considered for illustrating a method according to the present invention.

In order to understand the operation of the method/device, an example of application will now be described in detail. The alternative network configurations considered are those shown in FIGS. 3 and 4, a Mesh topology and a Star topology connecting five Network Elements NE1 . . . NE5 inside a same node. It is supposed that, for each Network Element, 24 ports are dedicated to connect the elements each other, in the way described in FIGS. 3 and 4.

Figure 5:
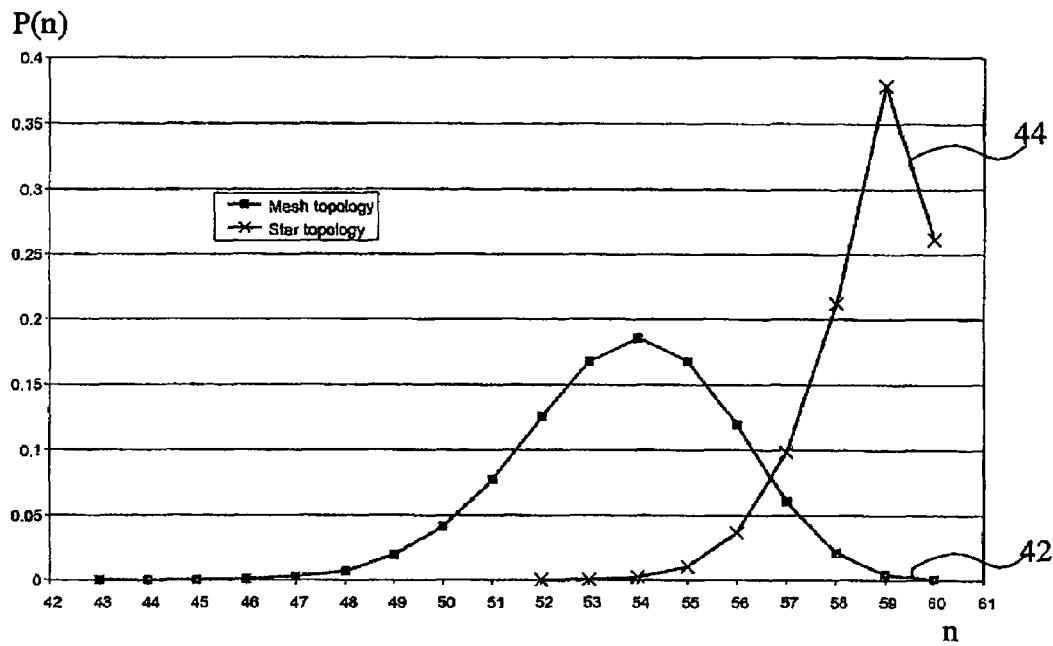
FIG. 5 is a graph showing a probability of satisfying a maximum number n of flows.

On the hypothesis of a random traffic demand, the values of the probability P(n) of routing at maximum n flows for the two topologies considered are shown in the graph diagram represented in FIG. 5. The two curves 42, 44 represent, respectively, the probability to satisfy at maximum n flows for the Mesh and for the Star topology.

Considering the relative costs shown in the following table for the main transmitting elements of the network under study, it is possible to evaluate the flow's unit cost C(n) for the two topologies under study. The complexity factors of the transmitting elements are proportional to the costs of the same transmitting elements.

| Equipment | Relative cost |
|---|---|
| DXC | 0.53 |
| DXC's port | 0.0004 |
| Star's core | 0.37 |
| Port of the star's core | 0.0002 |

Figure 6:
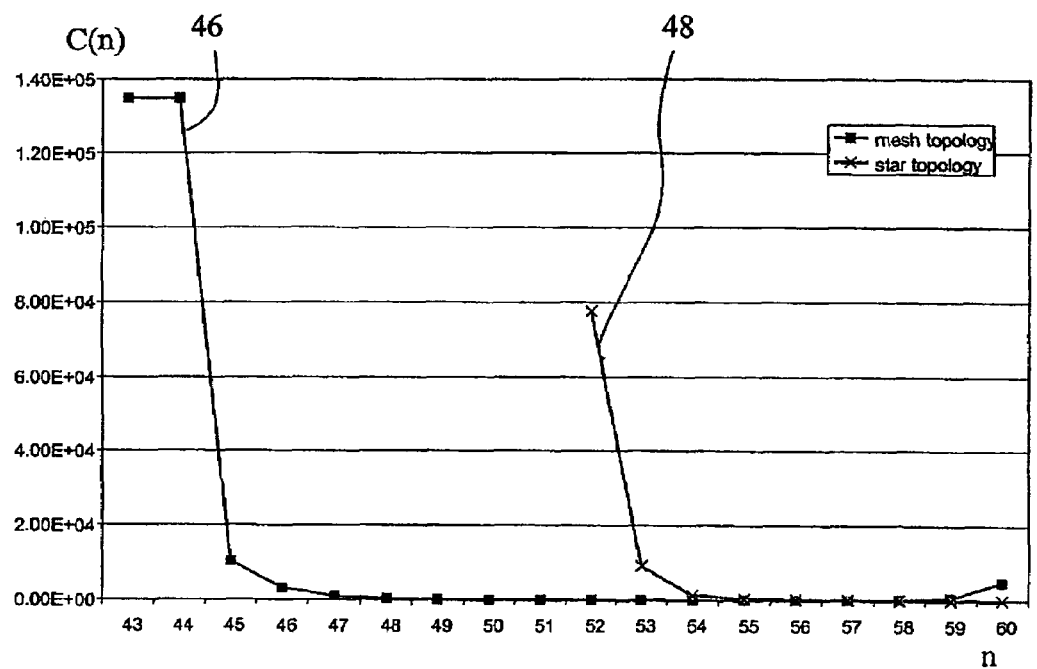
FIG. 6 is a graph showing a flow's unit cost as a function of the probability of satisfying a maximum number n of flows.

The curves obtained for the flow's unit cost functions C(n) are shown in FIG. 6, wherein 46 represents the curve relative to the Mesh topology and 48 represents the curve relative to the Star topology.

In order to correctly analyse the curves of FIG. 6, it is important to understand that, since the two topologies have a different range of maximum number n of flows routable, the comparison of the flow's unit cost C(n) has to be done in the region in which both probability functions P(n) are defined (i.e. where P(n)>0). In the case shown, this condition corresponds to values of the maximum number of flows routable n in the range between 52 and 60, as can be seen in FIG. 5.

Figure 7:
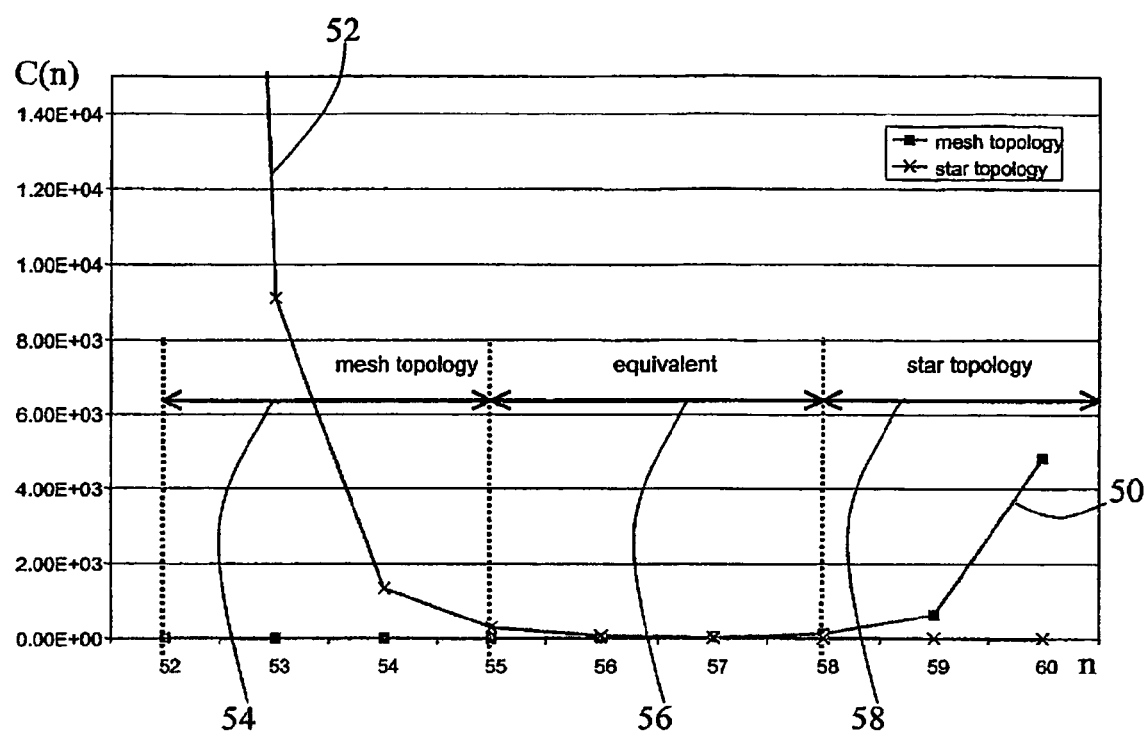
FIG. 7 is a graph showing comparison results of a method/device realized according to the present invention.

The comparison of the flow's unit cost functions C(n) for the two topologies under study, in the region 52<=n<=60, is shown in FIG. 7.

The chart of FIG. 7 can be used for determining three different regions, indicated by the black arrows 54, 56 and 58, showing different regions of decision.

In particular the chart shows that if one knows that, inside the network under study, it will not be necessary to route more than 55 flows, the Mesh topology will be more economical, on the other hand, if it will be necessary to route, at maximum, between 56 and 58 flows, the two topologies will be equivalent, ultimately, if it will be necessary to route more than 58 flows, the Star topology will be more convenient than the Mesh one.

The invention claimed is:

1. A method of designing a transport network for routing a plurality of routable flows, said transport network having a plurality of network elements and a plurality of connections between said network elements, the method comprising:
    a) defining a first network configuration and at least one alternative network configuration for said transport network;
    b) calculating for each of said first and any alternative network configuration, a probability function representing, for each maximum number of routable flows, the probability of routing such a number of flows in the network configuration currently considered, wherein said probability function is calculated as the ratio between the number of times that a maximum number of routable flows has been successfully routed by means of a test routine repeated a predetermined number of times, and the number of times said test routine has been repeated;
    c) calculating for each of said first and any alternative network configuration, a complexity function calculated as the ratio between a sum of complexity factors relative to the network elements of the network configuration currently considered and said probability function; and
    d) comparing the complexity functions of said first and any alternative network configurations, for choosing a network configuration having a lowest complexity value.

2. The method as claimed in claim 1, wherein said test routine comprises:
    e) generating a first random number representing a first network element;
    f) generating a second random number, different from said first random number, representing a second network element;
    g) searching a free path between said first network element and said second network element and, in case said free path has been found, increasing a counter of maximum routable flows and marking said path as a routed flow; and
    h) repeating steps (e) to (g) until no one free path can be found for routing a new flow.

3. The method as claimed in claim 2, wherein first and second random numbers are weighted random numbers in order to simulate a polarized traffic demand in the network.

4. The method as claimed 2, wherein said step of searching a free path provides for searching initially a shortest path between said first and second network elements for successively searching a longer path if said shortest path has not been found.

5. The method as claimed in claim 1, wherein said step of comparing the complexity functions is performed calculating said complexity function for each network configuration considered in correspondence of an estimated maximum number of routable flows in said transport network.

6. The method as claimed in claim 1, wherein the complexity factor of a network element is proportional to the cost of the same network element, and said complexity function represents a unit-cost-per-flow function.

7. A computer readable medium comprising computer program code executable by a computer, the computer program code configured to perform a method of designing a transport network for routing a plurality of routable flows, said transport network having a plurality of network elements and a plurality of connections between said network elements, the method comprising:
 a) defining a first network configuration and at least one alternative network configuration for said transport network;
 b) calculating for each of said first and any alternative network configuration, a probability function representing, for each maximum number of routable flows, the probability of routing such a number of flows in the network configuration currently considered, wherein said probability function is calculated as the ratio between the number of times that a maximum number of routable flows has been successfully routed by means of a test routine repeated a predetermined number of times and the number of times said test routine has been repeated;
 c) calculating for each of said first and any alternative network configuration, a complexity function calculated as the ratio between a sum of complexity factors relative to the network elements of the network configuration currently considered and said probability function; and
 d) comparing the complexity functions of said first and any alternative network configurations, for choosing a network configuration having a lowest complexity value.

8. A device for designing a transport network having a plurality of network elements and a plurality of connections between said network elements, the device comprising:
 a network configuration unit for defining a first network configuration and at least one alternative network configuration for said transport network;
 a probability evaluation unit for calculating for each of said first and any alternative network configuration, a probability function representing, for each maximum number of routable flows, the probability of routing such a number of flows in the network configuration currently considered, wherein said probability evaluation unit calculates said probability function as the ratio between the number of times that a maximum number of routable flows has been successfully routed by means of a test routine repeated a predetermined number of times and the number of times said test routine has been repeated;
 a complexity evaluation unit for calculating for each of said first and any alternative network configuration, a complexity function calculated as the ratio between a sum of complexity factors relative to the network elements of the network configuration currently considered and said probability function; and
 a comparison unit for comparing the complexity functions of said first and any alternative network configurations, for choosing a network configuration having a lowest complexity value.

9. The device as claimed in claim 8, wherein said test routine comprises the steps:
 generating a first random number representing a first network element;
 generating a second random number different from said first random number representing a second network element;
 searching a free path between said first network element and said second network element and, in case said free path has been found, increasing a counter of maximum routable flows and marking said path as a routed flow;
 repeating said steps until no one free path can be found for routing a new flow.

10. The device as claimed in claim 9, wherein said step of searching a free path provides for searching initially a shortest path between said first and second network elements for successively searching a longer path if said shortest path has not been found.

11. The device as claimed in claim 8, wherein said comparison unit compares the complexity functions by calculating said complexity function for each network configuration considered in correspondence of an estimated maximum number of routable flows in said transport network.

12. The device as claimed in claim 8 or 11, wherein the complexity factor of a network element is proportional to the cost of the same network element, and said complexity function represents a unit-cost-per-flow function.

* * * * *